(12) United States Patent
Nicholson

(10) Patent No.: US 7,010,861 B2
(45) Date of Patent: Mar. 14, 2006

(54) MARKING SYSTEM

(76) Inventor: Michael Nicholson, 7411 Rogers Ave., Upper Darby, PA (US) 19802

( * ) Notice: Subject to any disclaimer, the term of this patent is extended or adjusted under 35 U.S.C. 154(b) by 0 days.

(21) Appl. No.: 10/880,744

(22) Filed: Jun. 28, 2004

(65) Prior Publication Data

US 2005/0283986 A1 Dec. 29, 2005

(51) Int. Cl.
*B43L 13/02* (2006.01)
*B43L 9/04* (2006.01)

(52) U.S. Cl. .................. 33/42; 33/27.03; 33/32.1
(58) Field of Classification Search ........... 33/27.02, 33/27.03, 32.1, 32.2, 34, 41.1, 41.4, 41.6, 33/42, 44
See application file for complete search history.

(56) References Cited

U.S. PATENT DOCUMENTS

| | | | | |
|---|---|---|---|---|
| 392,143 A | * | 10/1888 | Wright | 33/32.2 |
| 426,997 A | * | 4/1890 | Jones | 33/44 |
| 482,886 A | * | 9/1892 | Weaver et al. | 33/42 |
| 762,673 A | * | 6/1904 | Arnold | 33/44 |
| 799,474 A | * | 9/1905 | Larson et al. | 33/44 |
| 1,122,050 A | * | 12/1914 | Williams | 33/32.2 |
| 1,593,826 A | * | 7/1926 | Hjert | 33/44 |
| 1,895,754 A | * | 1/1933 | Finkenwirth | 33/32.2 |
| 2,471,193 A | * | 5/1949 | Brower | 33/27.03 |
| 2,551,747 A | * | 5/1951 | Ille | 33/27.03 |
| 3,164,906 A | | 1/1965 | Andaloro | |
| 3,378,927 A | * | 4/1968 | Lowery | 33/27.03 |
| 3,491,448 A | * | 1/1970 | Quinton et al. | 33/27.03 |
| 4,334,360 A | | 6/1982 | Burns et al. | |
| 4,903,409 A | | 2/1990 | Kaplan et al. | |
| 6,418,631 B1 | | 7/2002 | Ramsthaler | |
| 6,708,422 B1 | * | 3/2004 | Stojanovski | 33/42 |
| 6,820,342 B1 | * | 11/2004 | Ramsthaler | 33/41.4 |
| 2004/0055168 A1 | * | 3/2004 | Allen | 33/42 |

* cited by examiner

*Primary Examiner*—G. Bradley Bennett
(74) *Attorney, Agent, or Firm*—Law Offices of John A. Parrish

(57) ABSTRACT

A marking system that may be configured to achieve a variety of marking devices. The marking system includes a main body member and a plurality of downwardly directed marking members.

8 Claims, 4 Drawing Sheets

MARKING SYSTEM

FIELD OF THE INVENTION

The invention relates to measurement systems which employ marking members, especially to systems which have a plurality of marking members.

BACKGROUND OF THE INVENTION

Numerous marking devices are known in the art. Although these devices have been used for marking, they suffer from the disadvantage of time consuming set up procedures. A need therefore exists for marking systems and devices which are flexible and avoid the disadvantages of the prior art.

BRIEF DESCRIPTION OF THE DRAWINGS

FIGS. 1, 2 and 9 show a first embodiment of the marking system which includes the main body member and marking members;

FIGS. 1 and 3 show a second embodiment of the marking system which includes the marking device of FIG. 2 including a top guide member;

FIGS. 1, 4 and 8 show a third embodiment of the marking system that includes the marking device of the first embodiment of FIGS. 2 and 9 together with a deep guide member;

FIGS. 1 and 5 show a fourth embodiment of the marking system that includes the marking device of the first embodiment shown in FIGS. 1, 2 and 9 together with a top guide member and a deep guide member;

FIGS. 1 and 6 show a fifth embodiment of the marking system that combines the marking device of the first embodiment shown in FIGS. 1, 2 and 9 together with a Butt Guide;

FIGS. 1 and 7 show a sixth embodiment of the marking system that combines the marking device of the first embodiment shown in FIGS. 1, 2 and 9 with a butt guide and a top guide;

FIGS. 1 and 10 show a seventh embodiment of the marking system that employs the marking device of the first embodiment together with an arc attachment;

FIGS. 1 and 11 show an eighth embodiment of the marking system that employs the marking device of the first embodiment together with a scribe attachment.

DETAILED DESCRIPTION OF THE INVENTION

The invention generally relates to a marking system. The components of the marking system may be configured to achieve a range of marking devices as described below. Each of the components may be made by a variety of known processes such as injection molding, casting, extrusion and the like.

Figure 1:
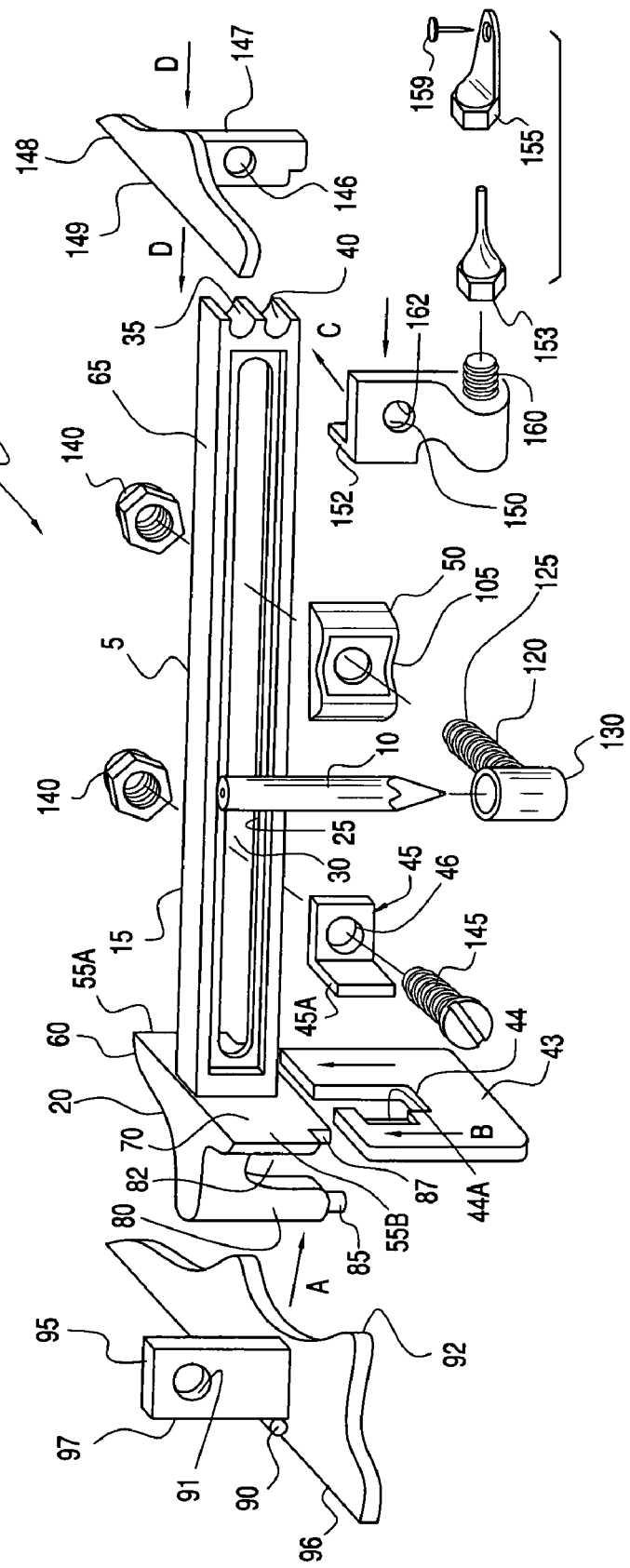
FIG. 1 is an exploded view of the marking system of the invention.
Figure 2:
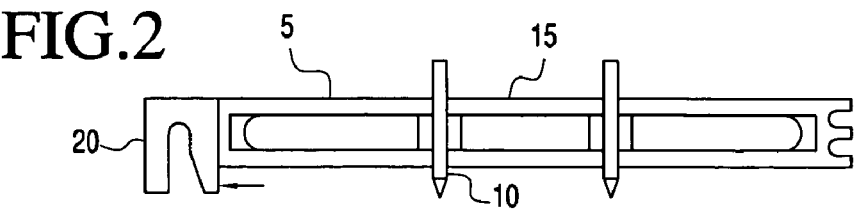
Figure 9:
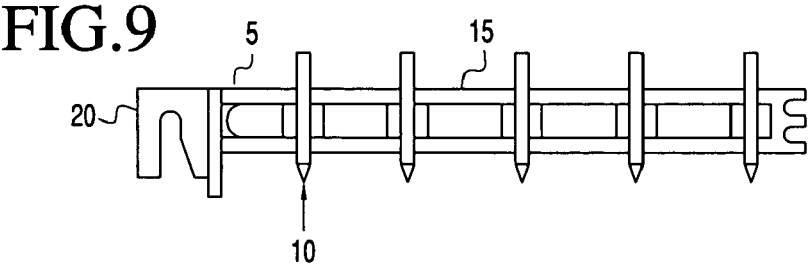

As shown in FIGS. 1, 2 and 9, a first embodiment of the marking system of the invention is illustrated. In this embodiment, a main body member 5 is employed with a plurality, preferably two, downwardly directed marking members 10 such as pencils.

Main body member 5, as shown in FIGS. 1 and 2, includes elongated section 15 and handle section 20. Elongated section 15 preferably includes indented groove 25 that has elongated slot 30 therein. Elongated slot 30 preferably is approximately equal to the length of elongated section 15. A first end of elongated section 15 includes upper slot 35 and lower slot 40. Handle section 20, as shown in FIG. 1, has a width that is preferably greater than the width of elongated section 15. Groove 25 is dimensioned to accept deep guide member lock 45 and marking member holder 50 to enable movement of deep guide member lock 45 and marking member holder 50 within groove 25.

Handle section 20 can include lateral sections 55A and 55B which extend beyond each side of elongated section 15. As shown in FIG. 1, top surface 60 of handle section 20 preferably is flush with upper surface 65 of elongated section 15. Handle section 20 preferably has a shallow guide portion 70 which extends below the bottom surface of elongated section 15. Handle section 20 includes leading arm section 80 to facilitate manipulation of main body member 5. Leading arm section 80 can include pin 85 for engaging hole 90 included in butt guide 95. Leading arm section 80, as shown FIG. 1, includes leading arm slot 82.

Marking member(s) 10 is secured to elongated slot 30 of elongated section 15 by marking member holder 50. Marking member holder 50 preferably includes curved portion 105 which has a radius of curvature that approximately equals the diameter of marking member 10. Marking member holder 50 also includes a hole for receiving threaded portion 125 gripping member 120. Marking member holder 50 is configured to fit groove 25 of elongated section 15. Gripping member 120, as shown in FIG. 1, includes threaded portion 125 and clasp portion 130. Gripping member 120 may be produced by injection molding from plastics such as nylon and polypropylene.

Marking member holder 50 which has gripping member 120 therein then is positioned in groove 25. Threaded nut 140 then is tightened onto threaded portion 125 of gripping member 120 to secure holder 50 to elongated section 15. Tightening of nut 140 onto threaded portion 125 causes clasp portion 130 to secure marking member 10.

As shown in FIGS. 1,2 and 9, this first embodiment of the marking system shows a marking device that includes two to four marking members. It is to be understood, however, that any number of marking members 10 may be secured to elongated section 15.

In use, shallow guide portion 70 of handle section 20 is brought into contact with an edge of a material to be marked. Main body member 5 having a marking member(s) 10 then is moved over the material while maintaining contact between shallow guide portion 70 and the edge of the material so that the material is marked at a desired location.

This embodiment of the marking system provides a marking device which may be employed, for example, to mark layouts for cutting of sheet materials such as panels and laminates, to mark locations for off-edge positioning of fastener members such as nails and screws, and to mark flexible metals such as coiled aluminum for bending.

Figure 3:
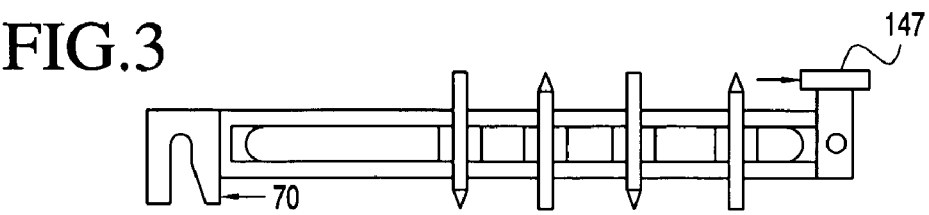

A second embodiment of the marking system of the invention, as shown in FIGS. 1 and 3, employs the device of the first embodiment of the marking system with the inclusion of top guide 147 and one or more upwardly pointing marking members 10. Top guide 147 is secured in the direction of arrow D to elongated section 15 at upper slot 35 by joining of threaded screw 145 and threaded nut 140 through hole 146 of top guide 147. This embodiment of the marking system provides a marking device which may be employed in a manner similar to that of the marking device of the first embodiment.

In use, inside edge 149 of top guide 147 is kept firmly against the outside edge of the material being marked. As the device is moved along the edge of the material, pressure is applied to marking members 10 so that legible marks are made.

The marking device of this second embodiment may be used in a variety of applications including but not limited to, marking of both sides of flexible metals such as coiled aluminum to locate opposing bends on a bending brake, as well as to mark locations for positioning of, such as, electrical boxes and elongated strip cuts in thin materials such as those which have a thickness of up to about 0.25 inches.

Figure 4:
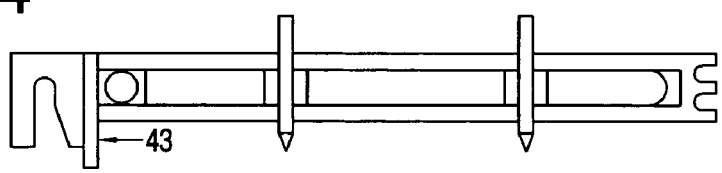
Figure 8:
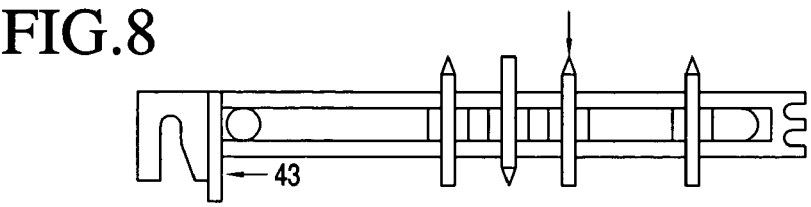

A third embodiment of the marking system of the invention provides a marking device which, as shown in FIGS. 1,4 and 8, employs the marking device of the first embodiment of the marking system with the inclusion of deep guide 43. Deep guide 43 has special utility for marking of "rolled edges" on doors and drawers.

The marking device of this third embodiment may use both upwardly and downwardly pointing marking members 10. Deep guide 43, as shown in FIG. 1, can be in the form of a rectangle that includes slot 44 for engaging elongated section 15. The depth of deep guide 43 exceeds the depth of handle section 20 that includes shallow guide portion 70. Deep guide 43 is positioned on elongated section 15 to abut lateral portions 55A,55B of handle section 20. Deep guide 43 is secured against lateral sections 55A,55B by deep guide lock 45. Deep guide lock 45, as shown in FIG. 1, can be an L shaped tab member dimensioned to fit groove 25. Deep guide lock 45 includes hole 46 for accepting a fastener such as threaded screw 145 to retain deep guide member lock 45 in a desired location. Deep guide preferably includes indent 44A for receiving vertical section 45A of deep guide lock 45.

The marking device of this third embodiment may be employed in a manner similar to that of the device of the first embodiment. The marking device of this third embodiment may be used, for example, to mark hardware locations on entry doors and jambs, mark multiple molding locations off of an outside edge of cornices and mantles, to mark locations for cutting of thick building materials such as a wallboard, for locating of electrical boxes, to mark elongated cuts in lumber and sheet materials, to mark flutes in lumber for pilasters, as well as to mark locations for alignment of "Siding J channels" around doors and windows.

Figure 5:
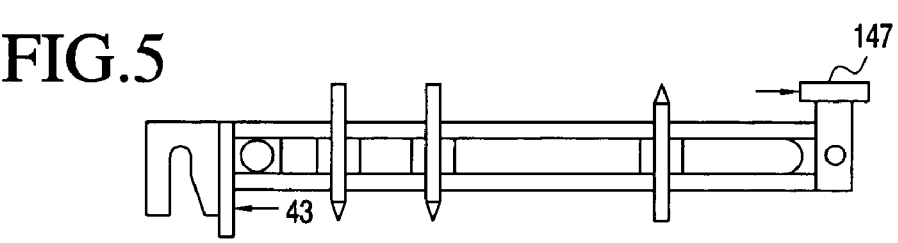

A fourth embodiment of the marking system of the invention provides a marking device which, as shown in FIGS. 1,3 and 5, includes a combination of the marking devices of the second and third embodiments.

In use, edge 149 and shallow guide portion 70 are maintained in contact with respective outside edges of the material being marked. As the device is moved along the surface of the material, pressure is applied to marking members 10 so that legible alignment marks are made.

This fourth embodiment of the marking system may be used, for example, to mark locations for installation of hardware for doors and drawers in cabinetry.

Figure 6:
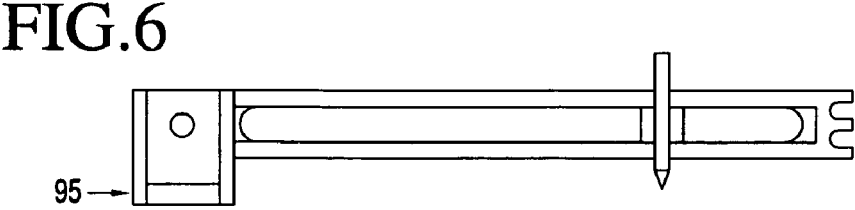

A fifth embodiment of the marking system of the invention provides a marking device which, as shown in FIGS. 1 and 6, includes the marking device of the first embodiment with the inclusion of butt guide 95. Butt guide 95 includes vertical strut 97 that includes a hole for receiving threaded screw 145 there through. Butt guide 95 includes hole 90 for receiving pin 85. Butt guide 95 is secured to handle section 20 in the direction of arrow A to cause pin 85 to engage hole 90. In so doing, hole 91 is brought into alignment with slot 82. Threaded screw 145 then is passed through slot 82 and hole 91 and is secured by screw 145 to retain butt guide 95 on handle section 20. Handle section 120 can include notches 87 on shallow guide portion 70 for receiving protrusions 92 of butt guide 95 to assist in stabilizing butt guide 95 against handle section 120.

In use, edge 96 of butt guide 95 is maintained in contact with the inside edge of the material being marked. As the device is moved along the edge of the material, pressure is applied to marking members 10 so that legible alignment marks are made on the material.

The marking device of this fifth embodiment may be used, for example, to mark locations in walls for electrical outlet boxes from floors and countertops, to mark locations for attachment of ceiling crown moldings, to mark locations of wallpaper borders from ceilings, to mark multiple molding locations from an inside edge of a molding, a board edge of a panel, a cornice and a mantel, to mark uneven wall lines to mate countertops, to mark J-channels in soffits, as well as to mark shelf locations in closets and cabinets such as for placement of adjustable rails and pin rails for location of shelving.

Figure 7:
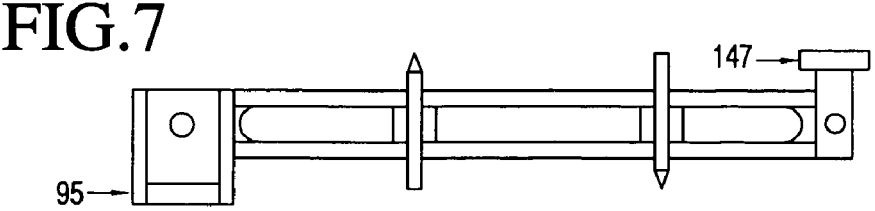

A sixth embodiment of the marking system of the invention relates to a marking device which, as shown in FIGS. 1 and 7, includes the marking device of the first embodiment with the inclusion of a butt guide 95 and top guide 147.

In use, edge 149 and shallow guide portion 70 are maintained in contact with respective outside edges of the material being marked. As the device is moved along the surface of the material, pressure is applied to marking members 10 so that legible alignment marks are made.

The device of this sixth embodiment may be used, for example, to mark locations for door hinges in cabinets and doors and to mark locations for entry door-jamb hinges.

Figure 10:
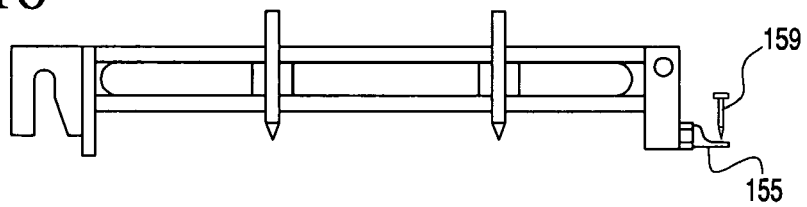

A seventh embodiment of the marking system, as shown in FIGS. 1 and 10 relates to the marking device of the first embodiment with the inclusion of arc pin member 155. Arc pin member 155 includes pin 159. Arc pin member 155 is joined to rod 160 of support member 150. Support member 150 generally is in the form of an elongated "L" that includes lateral section 152 for engaging groove 25 of elongated section 15. Support member 150 is secured to elongated section 15 at upper slot 35 by passing threaded screw 145 through hole 162 of support member 150 into slots 35 of elongated section 15. Threaded screw 145 is engaged by nut 140 to secure support member 150 to elongated section 15. Preferably both rod 160 and arc pin member 155 are threaded.

In use, the marking device of this embodiment is located at a desired position on a material and pin 159 is caused to penetrate that material so as to anchor the marking device. The marking device of this embodiment then may be used to make circles and arcs by rotating main body member 5 around pin 159.

The marking device of this embodiment may be used, for example, to make arcs and circles on a material to mark patterns for ceiling fixtures, stair "first tread" patterns, "end arcs" for arch entries and rounded corners on countertops.

Figure 11:
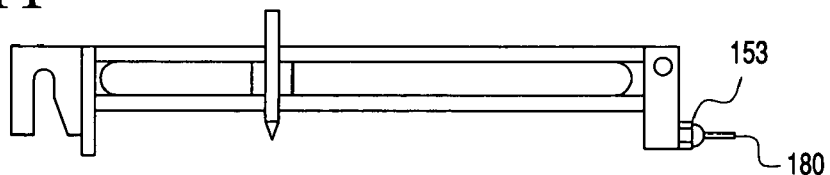

An eighth embodiment of the marking system, as shown in FIGS. 1 and 11 relates to the marking device of the first embodiment with the inclusion of support member 150 and scribe head 153. Rod 160 of support member 150 is used to receive scribe head 153. Preferably both rod 160 and scribe head 153 are threaded.

In use, leading edge 180 of scribe head 153 such as that on any of scribe heads 153A, 153B, 153C and 153D contacts the surface being scribed. Leading edge 180 rides on the surface of the material that is being scribed while main body 5 is maintained perpendicular to that surface. During movement of the device, pressure is applied to marking members 10 so that a legible line is made.

The marking device of this embodiment may be used, for example, to transfer uneven surfaces onto sheet materials for cutting and fitting.

Figure 11A:
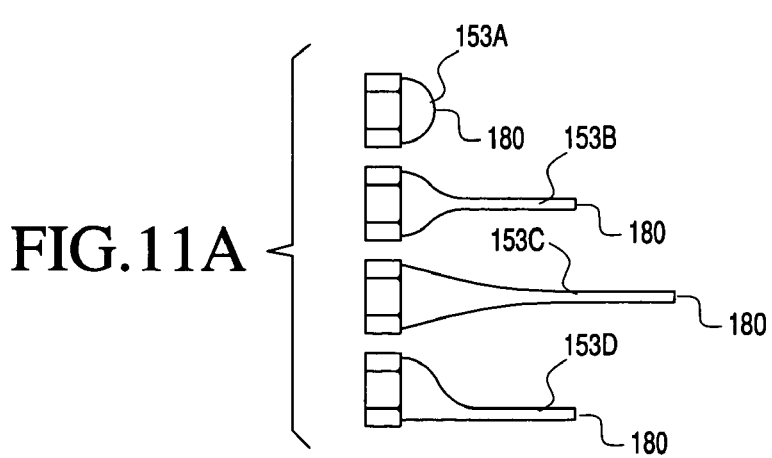
FIG. 11A shows various scribe members for use with the marking device of the ninth embodiment of the marking system shown in FIGS. 1 and 11.

Various types of scribe heads 153 may be employed depending upon the surface contour to be transferred. FIG. 11A shows three types of scribe heads which may be used to scribe surfaces. Scribe head 153A may be used to transfer surfaces which have gradual contours and which are free of steep setbacks. Scribe head 153B may be used to transfer surfaces which have steep setback contours up to about one half-inch below the horizontal. Scribe head 153C may be used to transfer surfaces which have steep setback contours of about one inch.

Figure 12:
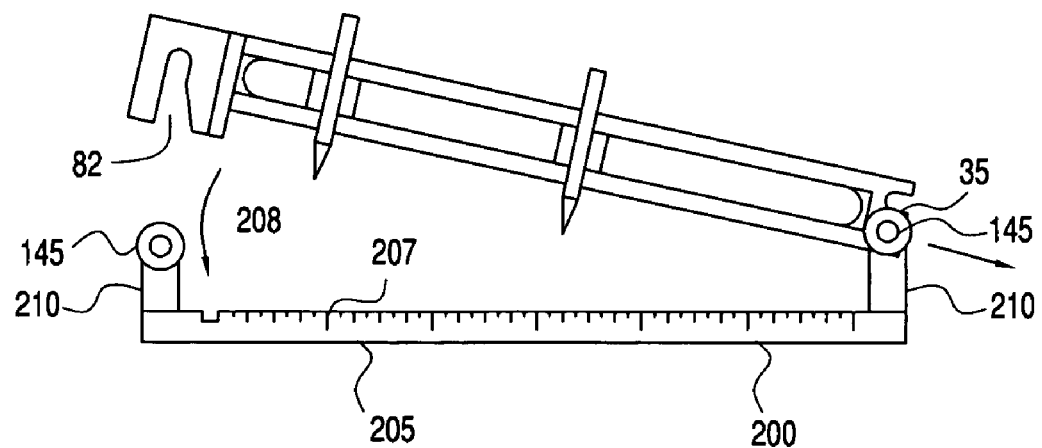
FIGS. 12, 12A show a gauge for use with the marking tools of the various embodiments of the marking system.
Figure 12A:
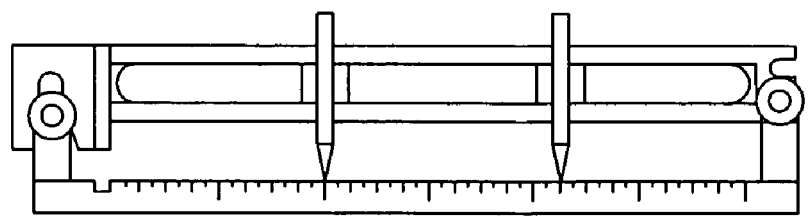

The marking system of the invention may include gauge 200, as shown in FIGS. 12 and 12A, to facilitate positioning of marking members 10 on elongated section 15. Gauge 200 includes elongated member 205 that has a marked scale 207 thereon. At each end of elongated member 205 is located a vertical support 210. Vertical support 120 includes a hole through which threaded screw 145 is inserted and onto which is placed nut 140.

In use of gauge 200, slot 35,40 of elongated section 15 that has marking members 10 thereon is positioned on screw 145 of vertical support(s) 210. For example, upper slot 35 of elongated section 15 is placed over screw 145 of vertical support 210. Main body member 5 including elongated section 15 then is rotated downwardly in the direction of arrow 208 as shown in FIG. 12A to cause slotted section 82 of handle section 20 to engage screw 145 on opposite vertical support 210. Marking members 10 then are moved to a desired position according to scale 207.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

What is claimed is:

1. A marking system that may be configured to achieve a variety of marking devices comprising a main body member (5) having an elongated section (15) and a handle section (20), the elongated section (15) having a width and a length including indented groove (25) that has an elongated slot (30) therein, wherein a first end of the elongated section (15) includes upper slot (35) and lower slot (40), and wherein the handle section (20) has a width greater than the width of the elongated section (15), and wherein the indented groove (25) is dimensioned to accept a deep guide member lock (45) and a marking member holder (50) to enable movement of the deep guide member lock (45) and the marking member holder (50) within groove (25), and wherein the handle section (20) includes lateral sections (55A) and (55B) which extend beyond the width of the elongated section (15).

2. The marking system of claim 1 wherein slot (35) is transverse to indented groove (25).

3. The marking system of claim 1 wherein slot (40) is transverse to indented groove (25).

4. The marking system of claim 1 wherein indented groove (25) is adapted to receive a deep guide member lock (45).

5. The marking system of claim 4 wherein indented groove (25) is adapted to receive marking member holder (50).

6. The marking system of claim 2 wherein the slot (35) is adapted to enable joining of top guide (147) to elongated section (15).

7. The marking system of claim 1 wherein elongated slot (30) is about equal in length to the length of elongated section (15).

8. A marking system that may be configured to achieve a variety of marking devices comprising a main body member (5) having an elongated section (15) and a handle section (20), the elongated section (15) having a width and a length including indented groove (25) that has an elongated slot (30) therein, wherein elongated slot 30 is about equal in length to the length of elongated section 15, and wherein a first end of the elongated section (15) includes upper slot (35) transverse to indented groove (25) and lower slot (40) transverse to indented groove (25), and wherein the handle section (20) has a width greater than the width of the elongated section (15), and wherein the indented groove (25) is dimensioned to accept a deep guide member lock (45) and a marking member holder (50) to enable movement of the deep guide member lock (45) and the marking member holder (50) within groove (25), and wherein the handle section (20) includes lateral sections (55A) and (55B) which extend beyond the width of the elongated section (15), wherein indented groove (25) is adapted to receive a deep guide member lock (45) and marking member holder (50), and wherein the slot (35) is adapted to enable joining of top guide (147) to elongated section (15).

* * * * *